United States Patent [19]

Knoth et al.

[11] Patent Number: 4,562,949

[45] Date of Patent: Jan. 7, 1986

[54] AUTOMATIC LATTICE FABRICATION APPARATUS

[75] Inventors: Wayne M. Knoth, Belmont; Dennis O. Corbin, Caledonia, both of Mich.

[73] Assignee: Universal Forest Products, Inc., Grand Rapids, Mich.

[21] Appl. No.: 623,975

[22] Filed: Jun. 25, 1984

[51] Int. Cl.[4] .............................................. B27F 7/17
[52] U.S. Cl. ...................................... 227/7; 29/33 K;
144/2 R; 144/350; 144/353; 227/76; 227/100; 227/111
[58] Field of Search ...................... 29/33 R, 33 K, 563,
29/364.1, 564.8, 556.5, 556.6; 144/2 R, 350,
353, 344–346; 227/7, 14, 100, 111, 27, 76;
156/92

[56] References Cited

U.S. PATENT DOCUMENTS

| D. 135,853 | 3/1943 | Cohen . | |
|---|---|---|---|
| 2,291,650 | 8/1942 | Robinson | 227/14 X |
| 2,624,442 | 1/1953 | Seidel | 198/29 |
| 2,672,658 | 3/1954 | Pedersen | 20/92 |
| 2,747,629 | 5/1956 | Blum | 144/309 |
| 2,906,062 | 9/1959 | Hohenfeldt | 47/47 |
| 3,302,841 | 2/1967 | Beck | 227/14 |
| 3,538,967 | 11/1970 | Hensley | 144/318 |
| 3,614,968 | 10/1971 | Hirz | 144/178 |
| 3,743,158 | 7/1973 | Cohn et al. | 227/110 |
| 3,873,015 | 3/1975 | Whitaker | 227/7 |
| 4,175,313 | 11/1979 | Neumann | 29/430 |
| 4,254,895 | 3/1981 | Cheak | 227/100 X |
| 4,280,312 | 7/1981 | Otts | 52/404 |

FOREIGN PATENT DOCUMENTS

3113742 10/1982 Fed. Rep. of Germany ..... 144/2 R

Primary Examiner—Douglas D. Watts
Attorney, Agent, or Firm—John A. Waters

[57] ABSTRACT

This invention relates to automatic lattice fabrication apparatus for automatically forming sections of lattice from strips of wood of a predetermined length and width. The apparatus includes an elongated horizontal conveyor that conveys lattice strips from a lay-up section through an automatic adhesive dispenser, under an automatic stapling bridge where the lattice is stapled, through rip saws that trim the sides of the lattice and, when desired, cut the lattice in half, and through an automatic cross-cut saw mechanism that periodically stops the conveyor, lowers a saw and cuts off a section of lattice when it reaches a predetermined length, and then lifts the saw out of the way and resumes conveyor movement.

11 Claims, 13 Drawing Figures

AUTOMATIC LATTICE FABRICATION APPARATUS

BACKGROUND OF THE INVENTION

1. Field of the Invention

This invention relates to an automatic lattice fabrication apparatus for automatically forming sections of lattice work formed of criss-crossed strips of wood of a pre-determined length and width.

2. Description of Prior Art

Lattice is formed typically of criss-crossed thin strips of wood ("lattice strips") that are glued or stapled together to form an open screen with square or rectangular holes through the lattice pattern. Lattice is sometimes used as indoor wall paneling but generally is used for a variety of outdoor purposes, including gardening or the like for purposes of supporting climbing plants.

At the present time, a lattice is generally formed by hand on a table, with strips of wood being laid in a criss-crossed pattern, glued together and stapled by hand. The lattice is then trimmed to its proper size with a hand or power saw. This operation is slow and expensive and involves a substantial amount of labor.

An object of the present invention is to provide automated machinery for automatically fabricating high quality lattice structure with a minimum labor requirement.

SUMMARY OF THE INVENTION

In accordance with the present invention, an automatic lattice fabricating machine is mounted on an elongated frame. An elongated horizontal conveyor is mounted on the frame and has position locating means thereon for positioning strips of wood in a criss-crossed pattern to form a lattice structure, the conveyor having a lattice lay-up section at an upstream portion of the conveyor, wherein lattice strips are laid in the proper position on the conveyor. An automatic stapling apparatus downstream of the lay-up section includes a plurality of stapling guns mounted transversely on a bridge extending over the conveyor. The stapling guns are movably mounted on a mounting mechanism for vertical movement. The stapling guns include ramps upstream of the stapling guns that engage the lattice as it approaches the head of the stapling guns and urge the stapler heads upwardly so that the lattice can pass under the stapler heads in proper position for stapling. A control mechanism actuates the stapler guns whenever the intersections of the wood strips are properly positioned under the stapler heads, preferably stopping the conveyor briefly during stapling. Rip saws downstream of the stapler apparatus automatically trim the sides of the lattice at each side of the frame. An automatic cross-cut saw positioned on a bridge downstream of the stapler automatically cuts the lattice into sections. The saw is transversely and vertically movable so that it automatically lowers into position and moves transversely to cut the lattice into sections and then raises upwardly out of the plane of the lattice. The control mechanism stops the conveyor while the lattice is being cut into sections in this manner.

An important feature of the present invention is the manner in which the stapler guns are mounted. The stapler guns have stapler heads at an upstream end with stapler cartridges extending horizontally away from the heads in a downstream direction along the conveyor. The staplers are mounted on pivoting or parallelogram linkage that lets the stapler head move upwardly to accommodate different thicknesses of lattice. This permits proper positioning of the stapler head over each intersecting lattice strip without requiring strips of uniform fitness or precise positioning of the stapler head.

In the present invention, the cross-cut saw is mounted on a separate frame and operated by a hydraulic motor. Pneumatic cylinders pivot the cross-cut saw upwardly and downwardly about a pivoted carriage member in order to bring it in contact with the lattice work passing thereunder. The saw carriage member is transversely movable under hydraulic force along a bridge over the frame.

An additional feature of the present invention is a pneumatically operated automatic adhesive dispenser mechanism that includes a pair of automatic adhesive dispensers mounted on opposite sides of the frame on a bridge that extends over the conveyor. The control mechanism causes the adhesive to be dispensed whenever a wood strip is properly positioned below the dispenser nozzle.

The control mechanism preferably is an electronic controller but conventional relay timing circuits will work. Timing is provided by a limit switch that senses each section of conveyor by means of conveyor timing blocks mounted on the underside of the conveyor.

The present invention provides a simple and effective machine for automatically fabricating high quality lattice using a minimum amount of labor.

These and other features and advantages of the present invention will be described in more detail below in connection with a description of the preferred embodiment of the present invention.

DETAILED DESCRIPTION OF PREFERRED EMBODIMENT

Figure 1:
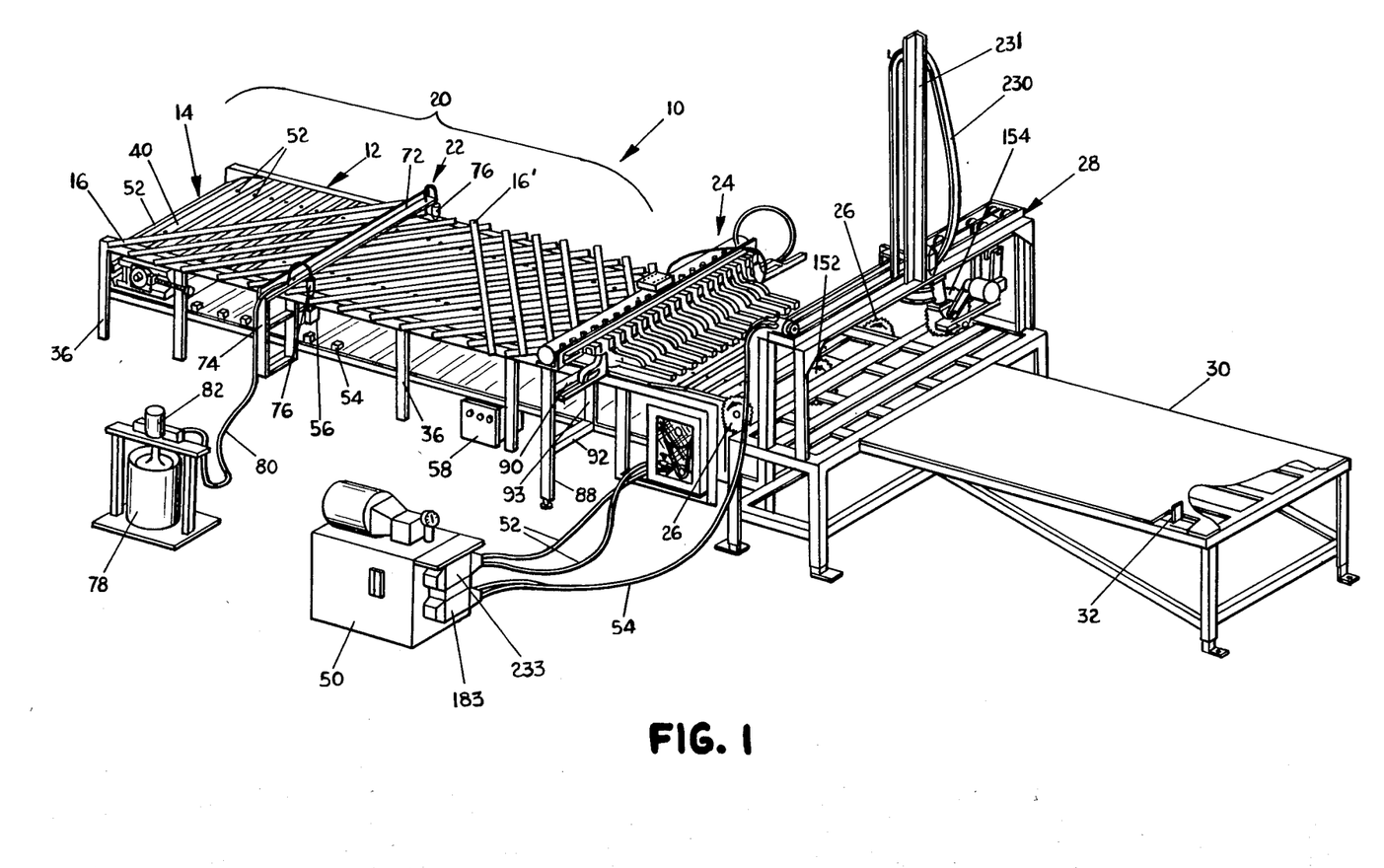
FIG. 1 is a perspective view of an automatic lattice fabricating macnine constructed in accordance with the present invention.

Referring to the drawings, and more particularly to FIG. 1, a lattice fabricating machine 10 constructed in accordance with the present invention makes it possible to construct lattice automatically and continuously in appropriately sized sections with a minimum of labor. The lattice fabricating machine comprises an elongated table or frame 12 with a slat conveyor 14 moving continuously along the frame from an upstream end to a donwstream end. The upstream end of the conveyor comprises a lay-up portion 20 of the machine, wherein lattice strips 16 are first laid on the moving conveyor in one diagonal direction and then lattice strips 16' are laid in a diagonally opposite direction on top of the lattice strips 16 and spaced apart to form a lattice type of framework. The strips can be glued at the lay-up section 20 by means of an automatic glue dispensing mechanism 22.

After the lattice work has been placed in proper position, the lattice is automatically stapled together by means of a novel pneumatic stapling mechanism 24. The sides of the lattice are then trimmed by means of electrically powered rip saws 26 at opposite sides of the frame. The lattice then passes through an automatic cross-cut saw mechanism 28 and on to a table 30 at the downstream end of the mechanism. When the end of the lattice strikes a limit switch 32 at the end of the table, the conveyor mechanism is stopped and the cross-cut saw is actuated to descend downwardly and transversely so as to cut the downstream section of lattice off. The lattice is then removed and the conveyor automatically reactuated to continue the operation of the machine.

The details of the individual components of the machine and the overall operation of the machine are described in more detail below.

Figure 2:
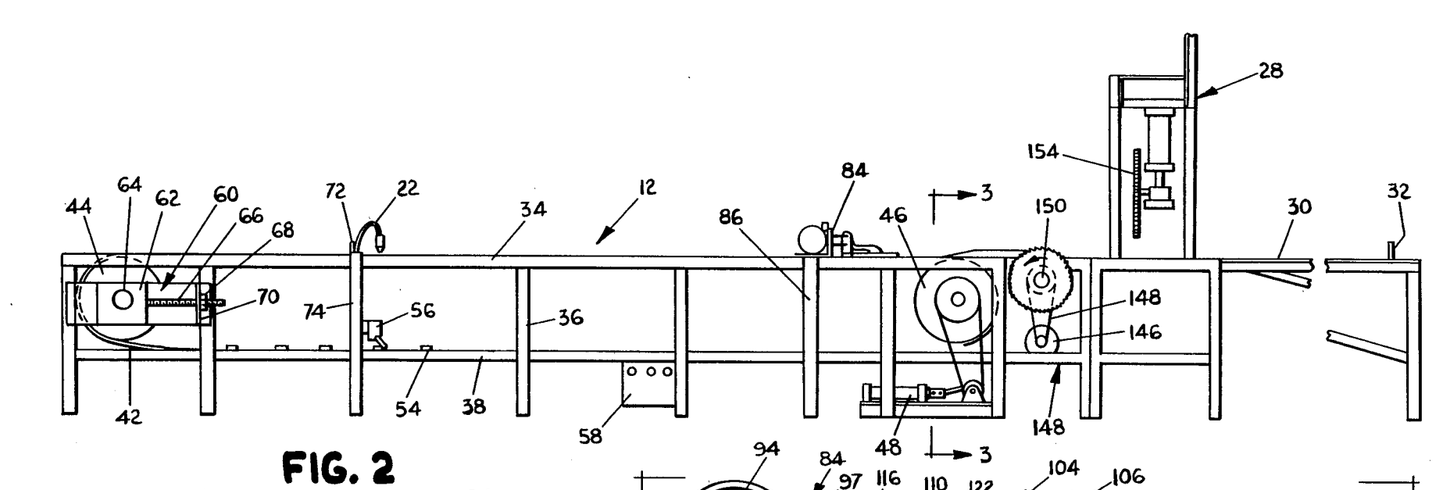
FIG. 2 is a side elevational view of the machine of FIG. 1.
Figure 3:
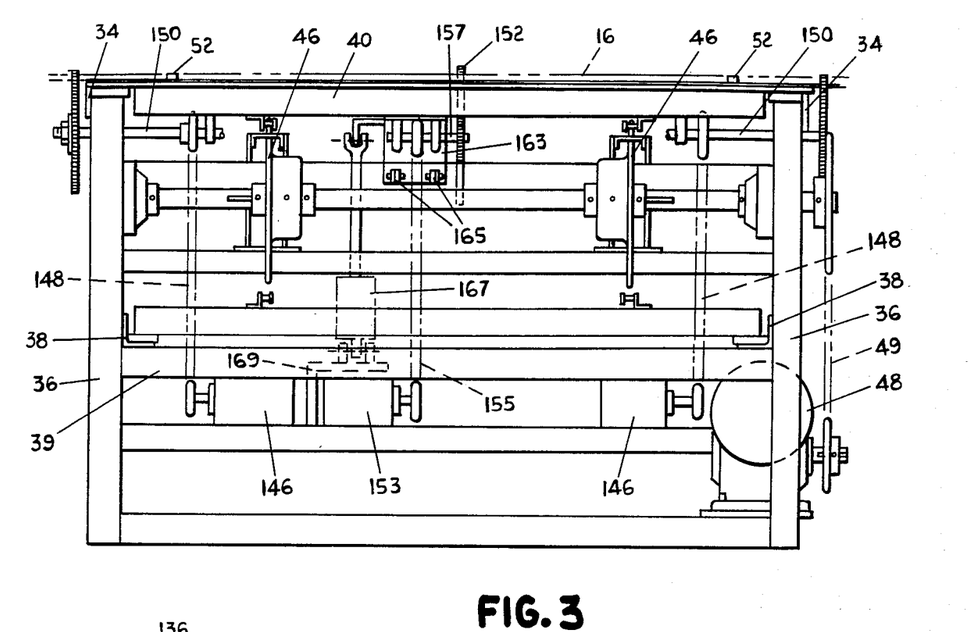
FIG. 3 is a sectional view taken along line 3—3 of FIG. 2.

Referring to FIGS. 2 and 3, the frame and conveyor assembly are shown in more detail. Frame 12 comprises horizontal side rails 34 and supporting legs 36 extending downwardly from the side rails to the ground. Lower side rails 38 are positioned between upper side rails 34 and the ground and support the slat conveyor on its return path. Cross members 39 support side rails 38.

Slat conveyor 14 is a conventional slat conveyor in most respects, comprising a plurality of closely spaced slats 40 (FIG. 1) extending between endless loop linked drive chains 42 interconnecting the undersides of the slats on opposite sides of the frame (FIG. 3). The drive chains ride on sprockets 44 at the upstream end of the frame and drive sprockets 46 at the downstream end of the frame. The downstream sprockets are driven by a hydraulic motor 48 through a chain drive 49, in which the power for which is provided by a hydraulic power unit 50 (FIG. 1). The hydraulic power unit drives the conveyor and the cross-cut saw carriage drive motor through hydraulic lines 52 to and from the conveyor drive motor and lines 54 to and from the carriage drive motor.

The upper surfaces of the individual slats in the slat bed conveyor include upwardly protruding dowels 52, which are positioned to assist in locating the lattice strips in their proper positions on the flat bed conveyor. With the dowels on opposite sides of the slat bed conveyor, the lattice strips are placed between the dowels and automatically are positioned in their correct positions.

The timing of all of the operations of the present mechanism is controlled by means of conveyor timing blocks 54 on the undersides of the slats of the slat bed conveyor. These timing blocks are shown protruding upwardly on the return loop of the slats adjacent rail 38, as shown in FIGS. 1 and 2. The timing blocks come in contact with a limit switch 56 positioned adjacent the underside of the conveyor as they pass in their forward path. A control signal is thus actuated each time a slat occupies a predetermined position in the loop. This timing signal is transmitted to a control mechanism 58 which controls the actuation and timing of the various operations in the apparatus.

In order to provide proper adjustment of the tension of the slat conveyor, a slat take-up mechanism 60 is positioned at the upper end of the conveyor. This mechanism comprises frames 62 positioned on each side of the framework in which axles 64 of the upstream sprockets are mounted. Frames 62 can be moved in an upstream or downstream direction by means of rotatable drive screws 66 drivingly attached to frames 62. Rotation of the drive screws through bolts 68 which are held in a fixed axial position by means of brackets 70 causes the frames 62 and the attached sprockets to be moved in an upstream or downstream direction.

As discussed above, in assembling the lattice, diagonal strips 16 are first laid on the slat conveyor at the upstream end of the conveyor. These lattice strips then pass under an automatic adhesive dispenser mechanism 22 mounted on a bridge 72 that extends across the conveyor. Bridge 72 is mounted on a side frame 74 that is spaced outwardly from the frame of the conveyor mechanism a sufficient distance to let the untrimmed ends of the lattice strips pass under the bridge of the adhesive dispenser mechanism. A pair of adhesive dispenser nozzles 76 are mounted on opposite sides of the bridge 72 and connected to a storage container 78 that can contain up to about five gallons of adhesive. A conduit tube 80 interconnects the storage container and the adhesive dispenser nozzles. Adhesive is pumped from the storage container to the adhesive dispenser nozzles by means of a pneumatic pump 82. The adhesive dispenser nozzles can be acuated by controller 58 (which can be a conventional electronic controller) or they can be actuated by physical contact between the nozzles and the strips passing underneath the nozzles. The automatic dispensation of adhesive on the strips is a desirable feature of the present apparatus.

After the first strips 16 have been laid in place and any adhesive applied to the strips, the second strips 16' are then manually laid in place with the positioning dowels serving to properly locate the strips.

The conveyor then conveys the properly located strips to stapling mechanism 24. Stapling mechanism 24, as shown in some detail in FIGS. 4-8, comprises a bridge 84 formed of right angle iron or the like that extends across the conveyor at a position above the lattice strips. The ends of bridge 84 are attached to a side frame 86 that is spaced outwardly from the side of the conveyor frame at sufficient distance to let the untrimmed ends of the lattice strips pass by the frame under the bridge. Frame 86 includes leg 88 extending downwardly from bridge 84 and connected to frame 12 by means of an upper horizontal arm 90 and a lower horizontal arm 92 extending inwardly to a vertical leg 93 extending between side rails 34 and 38.

An air manifold 94 is mounted between the legs of right angle bridge 84 and comprises a cylindrical closed tubular member. A transverse support member in the form of a generally U-shaped channel 96 with an open side facing in a downstream direction is attached to the upper leg 97 of bridge 84. U-shaped channel 96 extends transversely over the entire width of the conveyor mechanism. A plurality of staple guns 100 are releasably mounted side by side in the channel mounting mechanism. Staple guns 100 have staple heads 98 at an upstream end of the staple guns and have staple cartridges 102 extending longitudinally in a downstream direction. The staple heads are oriented side by side so that the staples are injected into the lattice in a plane transverse to the direction of movement of the conveyor.

Each staple gun 100 is attached to channel 96 by means of a movable mounting bracket 104 that permits upward and downward movement of the staple gun. The upward and downward movement of the staple gun is essential to accommodate lattice strips of different thicknesses so that the staple gun can always be properly positioned on the upper surface of two lattice strips that are to be stapled together. The mounting bracket 104 comprises an outer stapling gun support member and an inner retainer 114. The support member, shown in FIG. 5, preferably is a parallelogram linkage comprising parallel, horizontal mounting arms 106 spaced vertically apart and pivotably mounted at one end to a vertical arm 108 extending upwardly from a plate 109 on the top of the staple gun and at another end to a vertical mounting member 110. Mounting member 110 is in turn releasably attached to U-shaped channel 96 by means of threaded fastener 112 that extends through mounting member 110 into a threaded opening in retainer 114 positioned on the inside of the U-shaped channel. Inwardly extending and hooked flanges 116 on the open ends of the channel engage corresponding gooves in the retainer to hold the retainer within the channel and thus serve as a means for locking the mounting brackets in any given position in the channel. The transverse position of a stapler gun can be varied by loosening threaded fastener 112 and sliding the mounting bracket in a transverse position to its proper location. Also, the width of the retainer is less than the height of the opening so that the staple gun and retainer can easily be removed by loosening fastener 112, turning the retainer sideways in the channel (2 opposite corners of the retainer can be rounded off to facilitate this pivoting movement), and sliding the retainer out through the opening in the channel.

In the preferred practice of the present invention, channel 96 and retainer 114 are commercially available as a mounting unit. These are sold under the brand names Unistrut and Globestrut.

Figure 7:
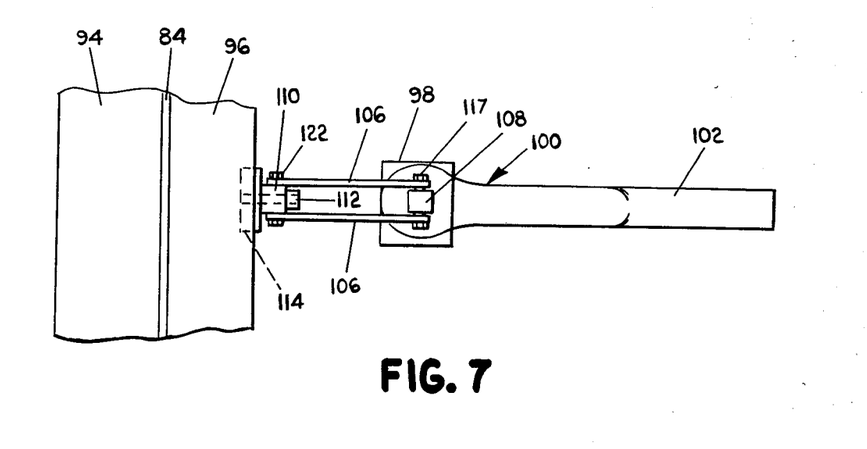
FIG. 7 is a view taken along line 7—7 of FIG. 5, showing a plan view of one stapler gun mounted over the conveyor.
Figure 8:
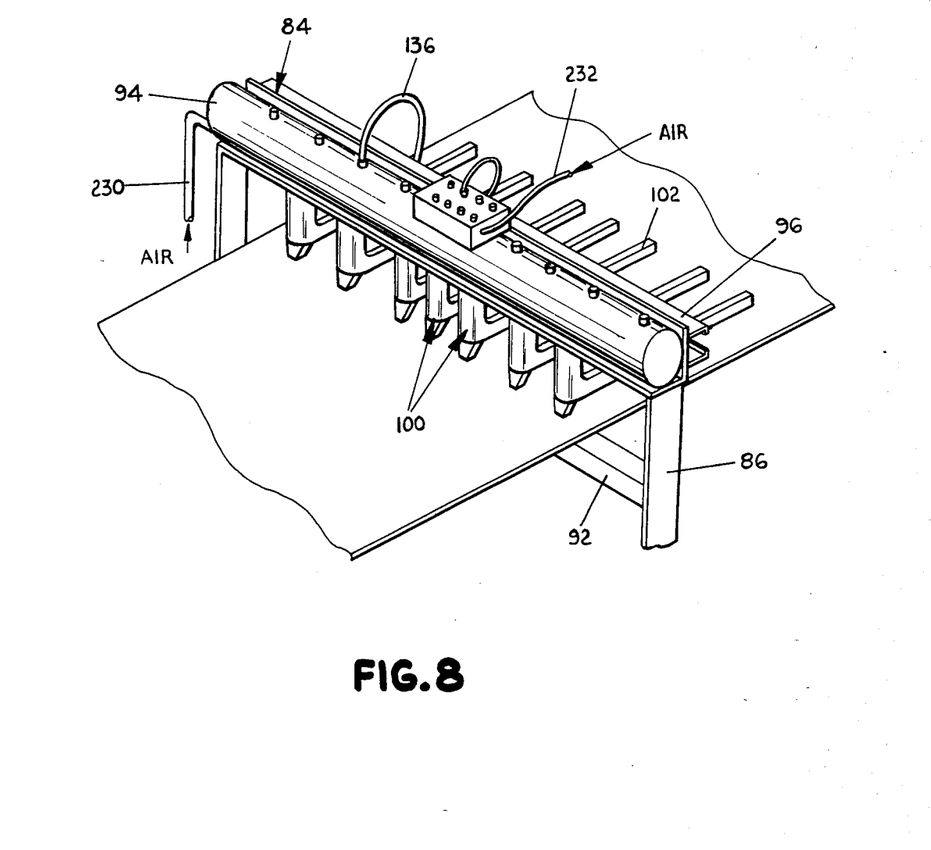
FIG. 8 is a simplified perspective view of the stapling mechanism of the present invention.

As shown in FIG. 7, the parallelogram links 106 are positioned on both sides of member 108 and are pivotably mounted to that member by means of bolts or axles 117 that extend through member 108. Similarly, the other ends of arms 106 are mounted on opposite sides of mounting member 110 by means of bolts or axles 122 that extend through the mounting member. A central opening in the mounting member accepts the threaded fastener 112 in order to attach the mounting member to the transverse U-shaped channel 96.

Figure 4:
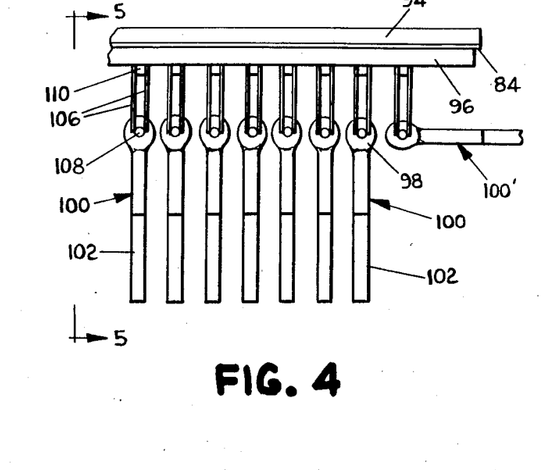
FIG. 4 is a partial plan view of the lattice fabricating machine showing the manner in which the pneumatic stapler guns are mounted over the conveyor assembly.

The lay-out of the individual stapler heads is shown in FIG. 4. As indicated, these stapler heads are immediately adjacent and very close to each other, so that all of the overlapping joints of the lattice can be stapled together. The stapler guns on the outer ends of the bridge are positioned in transverse orientation, as shown by the position of stapler gun 100' in FIG. 4, so that the end staples are oriented longitudinally. This permits the rip saws to trim the lattice without running into the staples.

Figure 6:
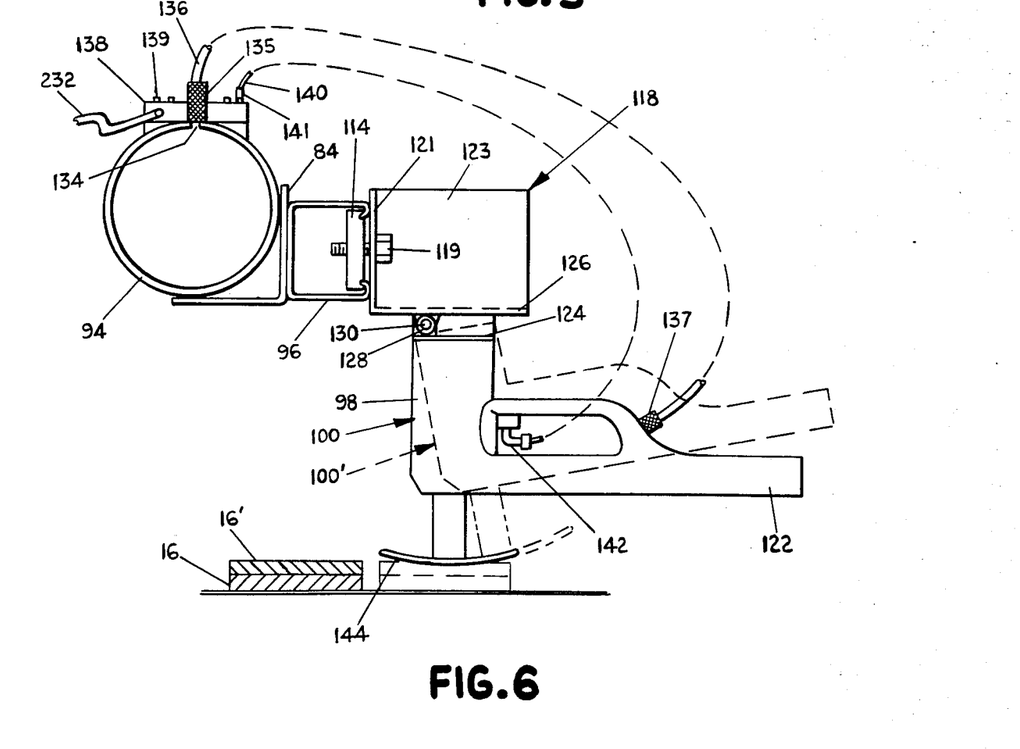
FIG. 6 is an alternative embodiment of a mounting mechanism for the pneumatic stapler guns.

Another type of mounting mechanism for the staple guns is shown in FIG. 6. In this mechanism, the same angle iron bridge 84 and same air manifold 94 are employed. Also, the same U-shaped channel 96 and retainer 114 are employed. The main difference is the mounting mechanism for mounting the staple guns to the U-shaped channel mechanism. In this embodiment, this is accomplished by a support member 118 that is attached by a fastener 119 to the U-shaped channel member 96 by means of retainer 114. Member 118 comprises mounting flange 121 that abuts the channel 96, a vertical plate 123 extending downstream therefrom and a horizontal plate 126 extending perpendicularly thereto. A pair of spaced bosses 128 extend downwardly from the underside of plate 126. A boss 129 extends upwardly from a plate 124 on the top of the staple gun and fits between bosses 128. A transverse bolt or axle 130 extends through aligned openings in the bosses 128 and through an opening in boss 129, pivotably mounting the staple gun 100 on the bosses 128 so that the gun can pivot in an upwardly direction as shown by phantom FIG. 100' in FIG. 6.

Figure 5:
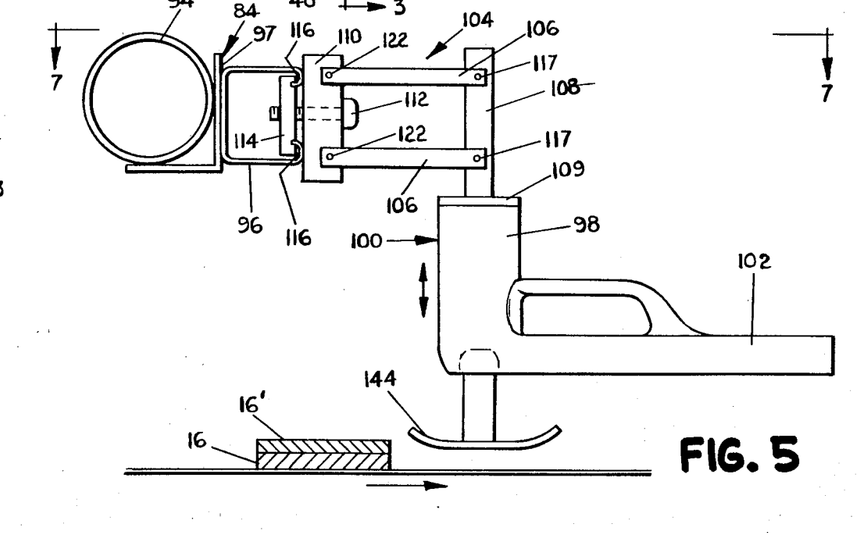
FIG. 5 is a view taken along line 5—5 of FIG. 4.

The difference in operation of the stapler mechanism of FIG. 6 and the mechanism of FIG. 5 is that when lattice passes underneath the staple mechanism of FIG. 6, the staple guns pivot as opposed to raising directly upwardly. The angle of the staples thus change with the rotation of the staple gun in FIG. 6. This can cause injection of staples at different angles and positions for different thicknesses of lattice. A wide variation in the angle of the staples is not expected so the variation usually does not cause any significant problems. Nonetheless, the parallelogram linkage has a straight vertical movement and is thus preferred.

As stated above, the staple guns are operated pneumatically through air manifold 94, which receives pressurized air from a source through conduit 230. Pressurized air is conveyed from the air manifold through individual staple gun outlets 134 spaced along the length of manifold 94. Fittings 135 interconnect the outlets with conduits 136 leading from fittings 135 to the staple gun, where quick release fittings 137 are employed. For clarity, only one of the conduits is shown in the drawings. Thus, the staple guns can be disconnected from their pneumatic connections easily for removal and disassembly.

The triggering of the staple guns is accomplished by an air trigger control mechanism 138 (FIG. 6). The air trigger mechanism has a separate air supply inlet conduit 232 and a separate solenoid valve 236 for controlling operation and has separate outlets 139 connected through fittings 141 (FIG. 6) to individual conduits 140 that lead to quick release trigger fittings 142 on the staple guns. The staple guns are actuated by the electronic controller.

The lower end of each staple gun comprises a deflector plate 144, which is a horizontally positioned plate or rail or shoe with a upwardly curved end facing upstream from the staple gun. These deflector plates engage the lattice strips as they approach the staple gun and direct the lattice strips underneath the heads of the staple guns, serving as cams to urge the staple guns to move and make room for the lattice strips to pass under.

After the lattice strips have been stapled together by the stapling mechanism, they are ready to be cut into sections of predetermined sizes. Rip saws 26 mounted at opposite sides of a rip saw frame 145 at the end of frame 12 trim the lattice to its desired width. Typically this is a four foot wide section. Each rip saw is operated by a separate electric drive motor 146 (FIG. 2) through an appropriate belt drive 148, through axles 150. As another feature, the apparatus can include an auxillary center saw 152 that can be raised or lowered as desired. In the illustration in FIG. 3, saw 152 is mounted on one end of a plate 163 that is pivotably mounted on the frame at the other end by bosses 165. An air cylinder 167 mounted on a bracket 169 raises and lowers the plate by pivoting it up and down. When raised, saw 152 will cut the lattice panel into two sections each two feet wide. This saw is powered by a separate hydraulic motor 153 through belt drive 155 and able 157.

As the sections with their trimmed sides continue to pass along the framework, they are pushed through the cross-cut saw mechanism 28 and on to a take-off table 30. When a section of lattice contacts limit switch 32, the limit switch sends a signal to controller 58, and the conveyor is stopped. At this point, a saw 154 in cross-cut saw mechanism 28 is lowered and actuated and moved transversely across the lattice to cut the lattice section off.

Figure 9:
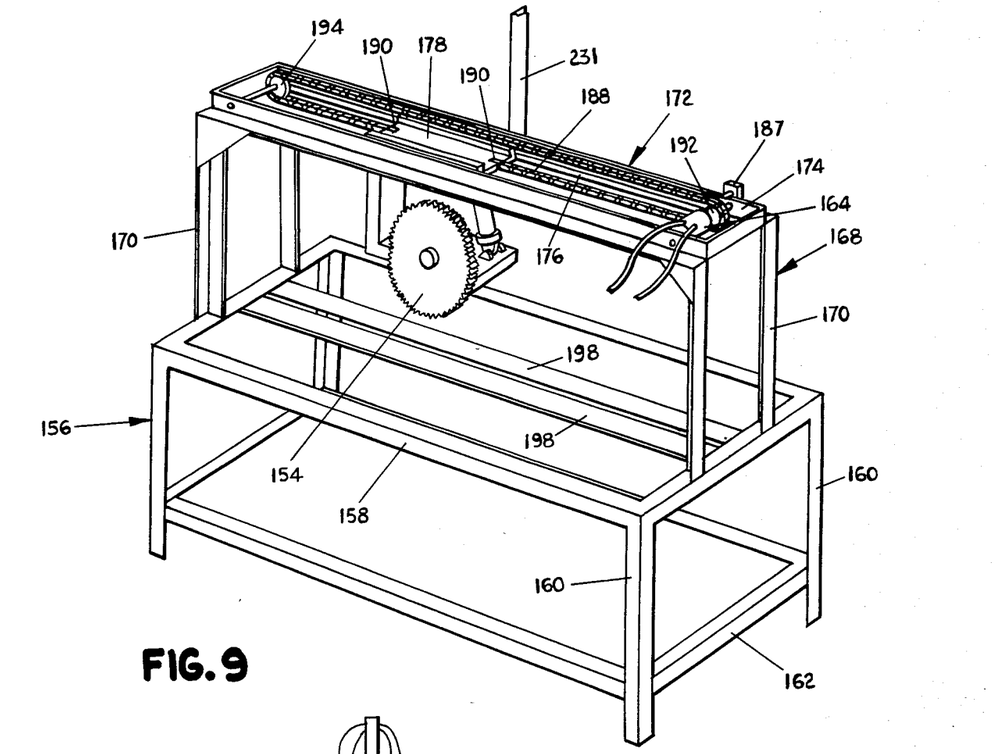
FIG. 9 is perspective view of the automatic cross-cut saw mechanism of the present invention.
Figure 10:
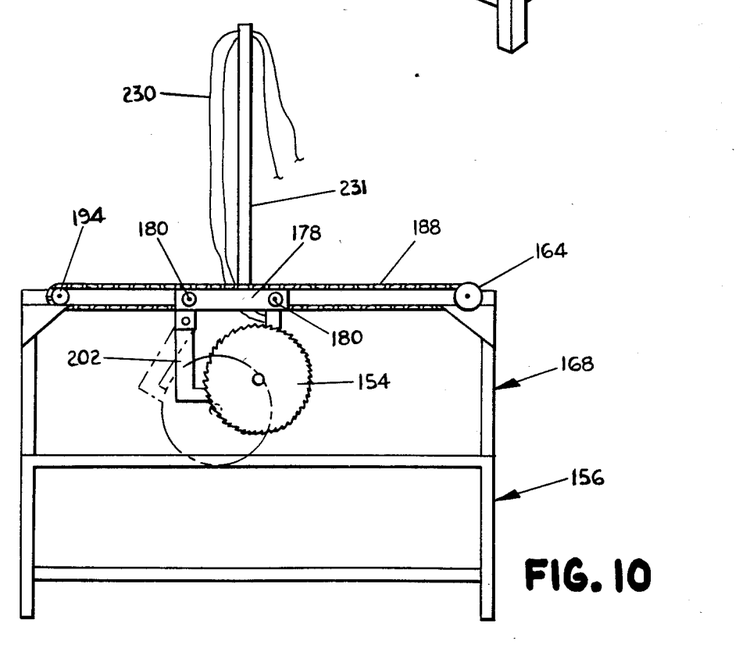
FIG. 10 is an end view of the cross-cut saw mechanism of the present invention.
Figure 11:
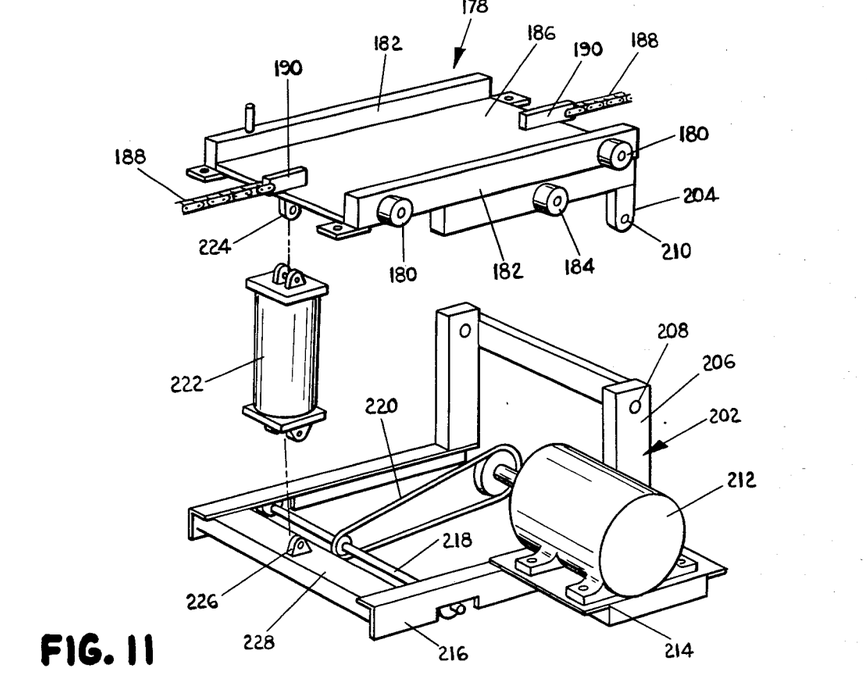
FIG. 11 is an exploded view of the movable frame mechanism for the cross-cut saw.

The cross-cut saw mechanism 28 is shown in detail in FIGS. 9-11. Cross-cut saw mechanism 28 is a separate module and includes a frame 156 positioned immediately adjacent to downstream end of frame 145. Frames 145 and 156 could be an extension of frame 12 but are preferably separate in the present invention. This permits easy removal of the saw mechanisms for repair or the like. Frame 156 comprises a rectangular upper box member 158 with legs 160 at the corners. A pair of spaced plates 198 extend between the sides of the box member below saw blade 154 and serve as support for the lattice as the saw cuts the lattice and fits in the space between the plates. A reinforcing box member 162 is positioned below box frame 158. An upper frame or bridge assembly 168 comprising upwardly extending legs 170 and transverse parallel rails 172 extending over box member 158. Rails 172 have vertical side edges 174 and inwardly extending horizontal flanges 176.

A carriage 178 having rotating wheels 180 on vertical sides 182 thereof (FIG. 11) rides between rails 172, with wheels 180 riding on flanges 176. A lower wheel 184 on the side of carriage 178 rides on the underside of each flange 176 at each side of the carriage. A flat plate 186 extends between sides 182 of the carriage. A chain 188 extends from a mounting block 190 on each end of the carriage and around a rotating sprocket 192 at one end of the frame and 194 at the other end of the frame, with the sprockets being rotatably mounted on axles extending between sides 174 of the frame. A reversible direction hydraulic motor 164 drives sprocket 192. When the motor turns sprocket 192 in either direction, the carriage is driven one way or the other along the track formed by inwardly extending flanges 176. This moves the saw back and forth transversely across the width of the frame. Carriage 178 has an L-shaped saw mounting frame 202 pivotably mounted between bosses 204 extending downwardly from the underside of the carriage. Mounting frame 202 includes upwardly extending legs 206 having openings 208 therein that receive axles or bolts through corresponding openings 210 in bosses 204. An electric saw drive motor 212 is mounted on a mounting plate 214 attached to lower side rails 216 of the motor mounting frame. Motor 212 drives saw axle 218 (the saw being removed to make the illustration more clear) by means of drive sprockets acting through a chain 220.

The saw is raised and lowered on the carriage by means of a pneumatic air cylinder 222 extending from a pivotable mounting boss 224 on the underside of the carriage to the pivotable mounting boss 226 on the lower left end (FIG. 11) of the L-shaped mounting frame. Boss 226 is mounted on a cross member 228 extending between the outer ends of rails 216. Air cylinder 222 is pneumatically acutated by solenoid 244, which drives the air cylinder through conduits 230 by means of a source of air pressure. An upwardly extending support frame 231 holds the air hoses above the track and permits transverse movement of the carriage.

Whenever the control mechanism actuates the solenoid 244, air cylinder 222 extends and pivots the saw motor downwardly about a pivot axis extending through openings 208 in the mounting frame to the lowered position 202' shown in phantom in FIG. 10.

In operation, whenever limit switch 32 is actuated, controller 58 actuates solenoid 244 (FIG. 12), which extends air cylinder 222 to lower the cross cut saw (which operates continuously). The carriage drive motor also is actuated to move the carriage frame from one side of the frame to the other, thus cutting the lattice panel from the upstream web. The controller also actuates a conveyor drive solenoid 233 (FIG. 1) that stops the conveyor.

When the carriage reaches the end of its track, it engages a limit switch 181, and this causes the controller 58 to reverse the direction of the carriage drive motor through a double acting solenoid 183 (FIG. 1) and return the carriage to its original position. At the same time, the controller causes solenoid 244 to retract air cylinder 222 to raise the cross-cut saw out of the path of the lattice. When a completed lattice panel is removed from the table at the end of the apparatus, limit switch 32 is de-energized, and this causes the controller to reactuate the conveyor drive motor through conveyor drive solenoid 233. Typically the delay is about five seconds for the cross-cut saw operation.

Figure 12:
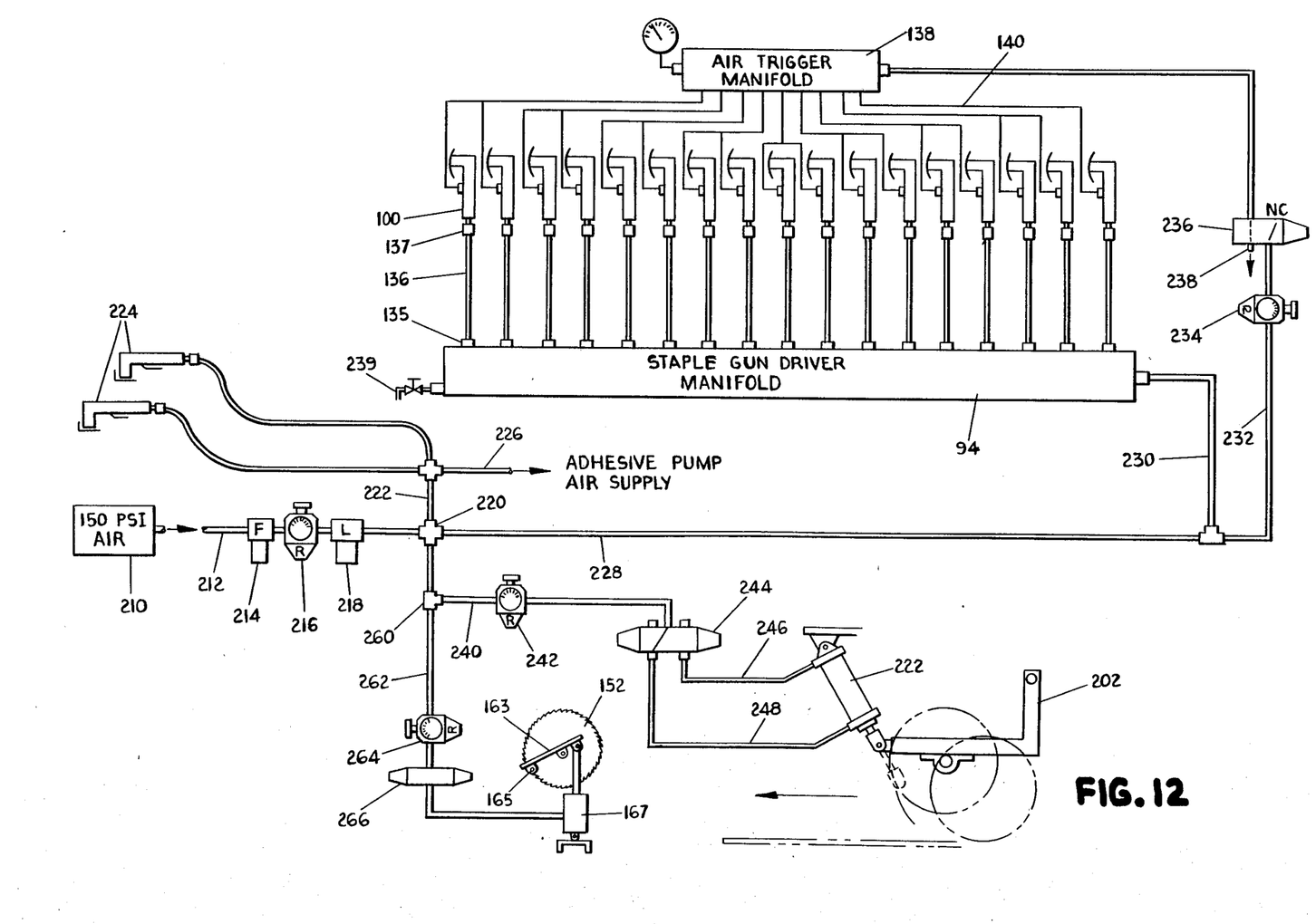
FIG. 12 is a hydraulic schematic diagram of the present invention.

A diagram of the pneumatic circuitry is shown in FIG. 12. Pressurized air preferably at 150 psi is provided from a conventional source 210 through a one inch pipe 212 and through a filter 214, a regulator 216, and a lubricator unit 218. The air pressure is then transmitted through a fitting 220 to a conduit 221 leading to two standard hand held staple guns 224. These are used on the table 30 at the end of the apparatus for manually repairing panels as needed. Conduit 221 also leads to a separate conduit 226 that conveys pressurized air to the adhesive pump air supply. Another conduit 228 leading from fitting 220 conveys pressurized air through a one inch pipe to staple gun driver manifold 94 and to air trigger manifold 138. Conduit 230 leads to the staple gun driver manifold and conduit 232 leads to air trigger manifold 138 through pressure regulator 234 and solenoid 236 with a back pressure relief outlet 238.

The preferred staple guns 100 of the present invention are manufactured by Senco Fastening Systems and sold as tool numbers LN3045. They have an outward flair guide body the double length magazine and are actuated by an air trigger.

Staple gun driver manifold 94 is provided with a drain value 239.

A third line 240 exiting from fitting 220 leads through a fitting 260 to the raising and lowering apparatus of the cross-cut saw mechanism. Line 240 leads through a pressure regulator 242 to a solenoid 244. This valve directs air pressure to either end of cylinder 222 through lines 246 or 248 to lower and raise the saw blade, respectively.

Line 262 leads through pressure regulator 264 and a solenoid 266 to air cylinder 167 that raises and lowers platform 163 for saw 152.

Figure 13:
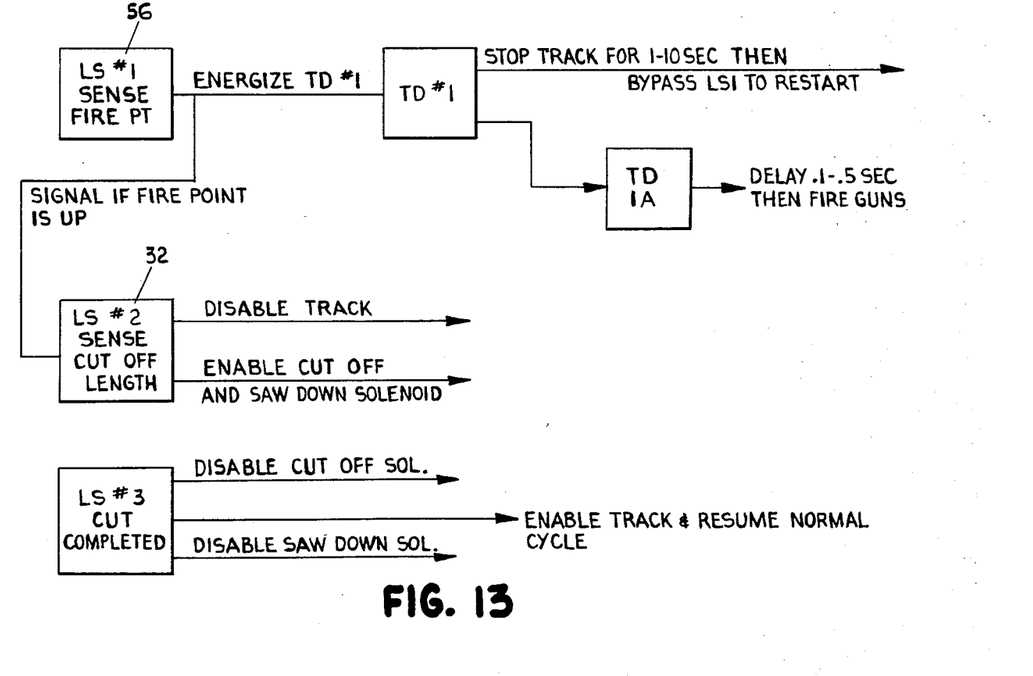
FIG. 13 is an electrical schematic diagram of the present invention.

An electrical schematic diagram of the present invention is shown in FIG. 13. Limit switch LS1 (limit switch 56) senses the point at which the staple guns should fire. When this occurs, the control mechanism energizes timing delay TD1, which stops the conveyor for about one second. At the same time, timing delay TD1 causes timing delay TD1A to fire the staple guns after a delay of 0.1 to 0.5 seconds. Thus, there is a slight delay in conveyor movenent just before and just after the staples are fired. This slight delay in the conveyor movement ensures that the staples are properly driven into the lattice strips. TD1 then bypasses limit switch LS1 and the conveyor starts up again.

Limit switch LS2 (limit switch 32) senses the panel cut-off length and disables the conveyor drive when actuated. It also enables the cut-off saw lowering solenoid 244 to extend air cylinder 222 and lower the saw. Finally, it enables the carriage drive solenoid 183, which causes the carriage to move across the frame.

Limit switch LS3 (limit switch 181) senses when the cut is completed and reverses the carriage drive solenoid and disables the saw lowering solenoid so that the saw is retracted and transferred transversely to its starting position. Removal of the completed panel de-energizes limit switch LS2 (switch 32) and resumes the conveyor drive.

It should be understood that the foregoing represents a description of a preferred embodiment of the present invention and that various changes and modification may be made in the arrangements and details of construction of these embodiments without departing from the spirit and scope of the present invention as defined in the appended claims.

We claim:

1. Lattice fabrication apparatus for forming lattice from lattice strips comprising:
    an elongated frame;
    an elongated conveyor positioned on the frame and having a generally horizontal conveying surface thereon, the conveyor having positioning means thereon for positioning the lattice strips in their desired overlapping position, the conveyor having a lattice lay-up portion at an upstream position of the conveyor;
    automatic stapling apparatus positioned above the conveyor downstream of the lay-up portion, the stapling apparatus including a staple bridge extending over and across the conveyor, the stapling apparatus comprising a series of staple guns mounted side-by-side on the bridge across the conveyor so as to be in alignment with the overlapping portions of the lattice as they pass under the staple guns, the stapling apparatus including stapler mounting means for movably mounting the staple guns on the bridge for vertical movement to accommodate lattice strips of different thicknesses, the stapler apparatus further including ramp means facing upstream from each staple gun to urge the lattice strips below the staple gun and urge the staple gun upwardly over the lattice strips;
    longitudinally oriented powered rip saws positioned downstream of the stapler mechanism on the sides of the frame that trim excess lattice from the sides of the lattice;
    a cross-cut saw mechanism positioned downstream of the stapler mechanism and aligned for receipt of stapled lattice, said cross-cut saw mechanism ordinarily permitting the lattice to pass unimpeded therethrough but being responsive to the length of said lattice to automatically stop the lattice and conveyor when a section of lattice passing through the cross-cut saw mechanism reaches a predetermined length, thereafter cutting off said section and then resuming transfer of lattice through the apparatus; and
    control means for sensing lattice position and automatically actuating the staple guns when the overlapping lattice strips are properly positioned under the guns, the control means sensing lattice section length and automatically stopping the conveyor and actuating the cross-cut saw mechanism to cut off the lattice when each section reaches a predetermined length, the control means actuating the cross-cut saw and moving the cross-cut saw into engagement with the lattice to cut the lattice at said predetermined length and thereafter moving the cross-cut saw out of engagement with the lattice.

2. Apparatus according to claim 1 and further comprising automatic adhesive dispenser means for dispensing adhesive on lattice strips as they are conveyed along the conveyor before overlapping strips are placed thereon and at locations where the strips will overlap.

3. Apparatus according to claim 1 wherein the stapler mounting means comprises means for permitting sideways adjustment of positions of the staple guns on the bridge.

4. Apparatus according to claim 3 wherein the stapler mounting means comprises a transverse support member on the bridge and individual mounting brackets mounted on each staple gun, the mounting brackets interfitting with the transverse support to suspend the staple guns from the transverse support, the mounting brackets being slidable transversely along the transverse support, the mounting means further including releasable fastener means for each mounting bracket for locking each staple gun in its desired lateral position on the transverse support, the fastener means being releasable for movement or dismounting of the staple guns.

5. Apparatus according to claim 4 wherein the transverse support member is a channel member with an open interior, an elongated opening on one side, and inwardly extending flanges partially covering the opening on each side of the opening, the mounting bracket for each staple gun comprising a retainer having a threaded opening therein fitting behind the flanges and sliding along the interior of the channel, the mounting bracket comprising a staple gun support to which the staple gun is attached, the staple gun support being positioned adjacent to the retainer outside of the channel, the staple gun support holding a threaded fastener that engages the retainer, tightening of the threaded fastener in the retainer serving to lock the staple gun support in its transverse position on the channel, the staple gun support permitting vertical movement of the staple gun with respect to the transverse support member.

6. Apparatus according to claim 1 wherein the stapler mounting means comprises a pivotable parallelogram linkage interconnecting each staple gun with the bridge, the parallelogram linkage constraining the movement of each staple gun to a generally vertical movement.

7. Apparatus according to claim 1 wherein the stapler mounting means comprises a pivot mechanism pivotably connecting each staple gun to the bridge, the pivot mechanism constraining movement of the staple gun to a pivotable movement about a transverse axis.

8. Apparatus according to claim 7 wherein the staple guns comprise stapling heads that face upstream so as to inject staples that are oriented transversely, the staple guns having horizontally disposed staple cartridges that extend downstream from the stapling heads, the stapling heads being attached to the stapler mounting means.

9. Apparatus according to claim 1 wherein the cross-cut saw means comprises:
a frame having a generally horizontal lower portion that receives and supports lattice for movement over the lower portion after it has been stapled, the frame also including an upper portion extending over the lower portion and including a transverse track running in a transverse path plane parallel to the lower portion;
a carriage movably mounted for transverse movement on the track;
transverse drive means for automatically moving the carriage back and forth on the track upon actuation;
a saw mounting frame positioned below the carriage and pivotably attached at one end to the underside of the carriage for downward and upward movement of the other end of the frame.
a transversely positioned cross-cut saw and motor therefor mounted on the mounting frame and being movable downwardly and upwardly by pivotal movement of the frame, the saw being positioned such that it intersects the lattice when it is lowered; and
lifting means for automatically lowering and raising the saw frame on actuation.

10. Apparatus according to claim 1 wherein the rip saws include a pair of side rip saws on opposite sides of the frame and a central rip saw positioned between the side rip saws, the central rip saw being raisable to cut the lattice into multiple side-by-side sections or lowerable out of the path of the lattice to leave the lattice as a single elongated section.

11. Apparatus according to claim 1 wherein the control means stops the conveyor while the staple guns are being actuated.

* * * * *